United States Patent

Doner

[11] Patent Number: 5,901,355
[45] Date of Patent: May 4, 1999

[54] METHOD USING DIFFERENT FREQUENCIES AND ANTENNA TYPES FOR REMOTES LOCATED IN AN INNER OR OUTER REGION OF A CELL

[75] Inventor: John R. Doner, Sebastian, Fla.

[73] Assignee: AirNet Communications Corp., Melbourne, Fla.

[21] Appl. No.: 08/743,451

[22] Filed: Nov. 1, 1996

[51] Int. Cl.$^6$ .................................................... H04Q 7/22
[52] U.S. Cl. ...................... 455/447; 455/450; 455/456; 455/509
[58] Field of Search .................................... 455/422, 446, 455/447, 449, 450, 451, 452, 453, 456, 462–5, 16, 509, 512, 513, 514

[56] References Cited

U.S. PATENT DOCUMENTS

| | | | |
|---|---|---|---|
| 4,144,496 | 3/1979 | Cunningham | 455/447 |
| 5,129,096 | 7/1992 | Burns | 455/422 X |
| 5,152,002 | 9/1992 | Leslie et al. | 455/16 X |
| 5,161,249 | 11/1992 | Meche et al. | 455/436 |
| 5,365,571 | 11/1994 | Rha et al. | 455/446 |
| 5,459,759 | 10/1995 | Schilling | 375/202 |
| 5,475,864 | 12/1995 | Hamabe | 455/452 |
| 5,551,060 | 8/1996 | Fujii et al. | 455/447 |
| 5,642,355 | 6/1997 | Smith | 455/450 X |

FOREIGN PATENT DOCUMENTS

| | | |
|---|---|---|
| 2230126 | 5/1974 | France . |
| WO 9323935 | 11/1993 | WIPO . |

Primary Examiner—Reinhard J. Eisenzopf
Assistant Examiner—Philip J. Sobutka
Attorney, Agent, or Firm—Farkas & Manelli PLLC

[57] ABSTRACT

A frequency allocation technique for a wireless system which employs remote subscriber Field Access Units (FAUs) that use omni-directional antennas in an inner region of a cell, and directional antennas in an outer region of the cell. Different frequency subsets are used for the inner and outer cell regions and FAUs located in the inner regions of homologous cells maintain separation from one another by limiting their operating power to a level needed to complete the radio link from the base station. A receiver portion of the base station has the capability to determine received signal power for each channel within the bandwidth being served. This provides the basic input for a channel selection algorithm which determines the quietest channel from among those channels not in use. A further constraint on the frequency allocation process is that a minimum number of channels always remain unused. That is, for example, among the available channels in each cell, only a subset of the channels are actually ever allowed to become active.

8 Claims, 5 Drawing Sheets

METHOD USING DIFFERENT FREQUENCIES AND ANTENNA TYPES FOR REMOTES LOCATED IN AN INNER OR OUTER REGION OF A CELL

FIELD OF THE INVENTION

This invention relates generally to wireless communications and in particular to a technique for assigning frequencies to mobile units according to a reuse pattern adapted for Wireless Local Loop (WLL) applications.

BACKGROUND OF THE INVENTION

The increasing demand for wireless communication services such as provided by cellular and Wireless Local Loop (WLL) systems requires the operators of such systems to attempt to make a maximum effective use of the available radio frequencies. Consider, for example that a WLL system operator is typically allocated a geographic territory and a certain amount of radio bandwidth that affords the ability to transmit and receive on only a particular number of radio channels. In an effort to make the best use of the allocated frequency space the geographic territory is divided into a number of sub-areas called cells. A number of base stations are deployed throughout the assigned territory, with there typically being one base station in each cell. Transmission power levels are kept low enough so that the subscriber units, called Fixed Access Units (FAUs), in adjacent cells do not interfere with each other.

The system operator can then determine how to split up the allocated radio frequencies among the cells so that FAUs using the same frequencies do not interfere with one another. This process is intended to maximize channel availability in the service area, that is, to maximize the number of channels which may be used in a particular area at any one time. The object of this frequency planning process is to reuse each frequency as often as possible. Cells which reuse the same frequency set in this manner are referred to as homologous cells. In general, reusing a frequency in every Nth cell thus means that 1/N of all frequencies are available in any given cell. It is therefore usually desirable to select the reuse factor, N, to be as small as possible in order to increase the capacity for handling remote units in each cell.

However, conflicting with this requirement is a real world consideration that as the reuse factor N is decreased, the interference between channels in homologous cells increases. In other words, there is a design dilemma in that as N decreases, so does the distance between homologous cells, and thus the amount of interference between FAUs located in different cells but operating on the same frequency increases. The ratio between the RF power of a desired carrier signal, C, and the interference, I, created by FAUs operating in homologous cells is referred to as the carrier-to-interference ratio, C/I. Thus, as the reuse factor N decreases, it is generally understood that the C/I ratio is normally expected to increase.

What is needed is a way to decrease the channel reuse factor by partitioning the use of frequencies among cells without also necessarily imposing an increase in the carrier to interference ratio.

DESCRIPTION OF THE INVENTION

Summary of the Invention

Briefly, the invention is a Wireless Local Loop (WLL) system which employs remote subscriber Field Access Units (FAUs) that use both directional and omni-directional antennas. The omni-directional antennas are used in an inner region of the cell, out to a specific radius, r, from the center of the cell. Directional antennas are used in an outer region of the cell, from the specific radius, r, out to the cell boundary radius, R. Optimally, the ratio between the inner radius, r, and outer radius, R, is chosen to balance the carrier-to-interference (CI) ratio to be about the same on average for FAUs in both the inner and outer regions.

In addition, different frequency subsets are used for the inner and outer cell regions, in order to reduce intra-cell interference. The FAUs located in the inner regions of homologous cells maintain separation from one another by limiting their operating power to a level needed to complete the radio link from the base station to the FAU, in both the uplink and downlink directions.

A receiver portion of the base station has the capability to determine received signal power for each channel within the bandwidth being served. This provides the basic input for a channel selection algorithm which determines the quietest channel from among those channels not in use. Thus, as newly activiated FAUs require an operating frequency to be assigned, the quietest channel among those available is first assigned.

A further constraint on this frequency allocation process is that a minimum number of channels always remain unused. That is, for example, among the available channels in each cell, only a subset of the channels are actually ever allowed to become active.

The results of a computer simulation of a WLL system employing directional antennas and the above frequency assignment algorithm has indicated that with an N=2 reuse pattern, it is possible to provide a higher carrier-to-interference ration (C/I) than with an N=3 reuse pattern operating with random channel selection.

In other words, an advantage of the invention is that a two cell reuse pattern with channel use in the manner specified by the invention can provide greater C/I and more active channels per cell than can be achieved by using a standard narrow band channel radio processing and random assignment schemes. In a specific example, up to 62 channels per cell can be allocated in an Advanced Mobile Phone Service (AMPS) type wireless local loop application with a 5 MHz radio allocation in accordance with the invention, whereas the same 5 MHz of spectrum would normally only support 22 channels per cell with a standard frequency reuse scheme and random channel assignment.

BRIEF DESCRIPTION OF THE DRAWINGS

For a more complete understanding of the invention and its novel advantages and features, reference should be made to the accompanying drawings in which.

DETAILED DESCRIPTION OF A PREFERRED EMBODIMENT

Figure 1:
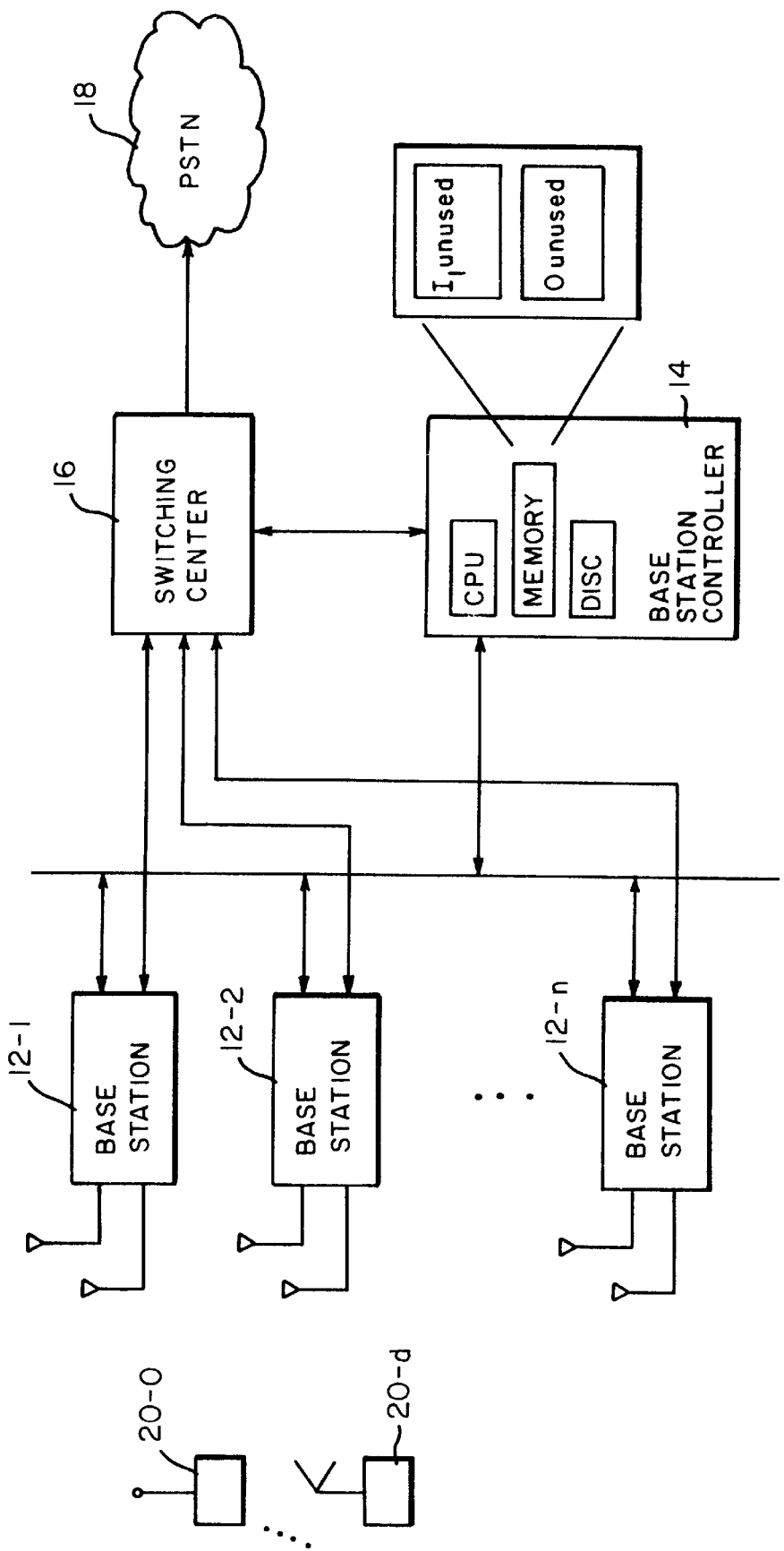
FIG. 1 is a block diagram of a wireless local loop (WLL) system in which the invention may be employed.
Figure 2:
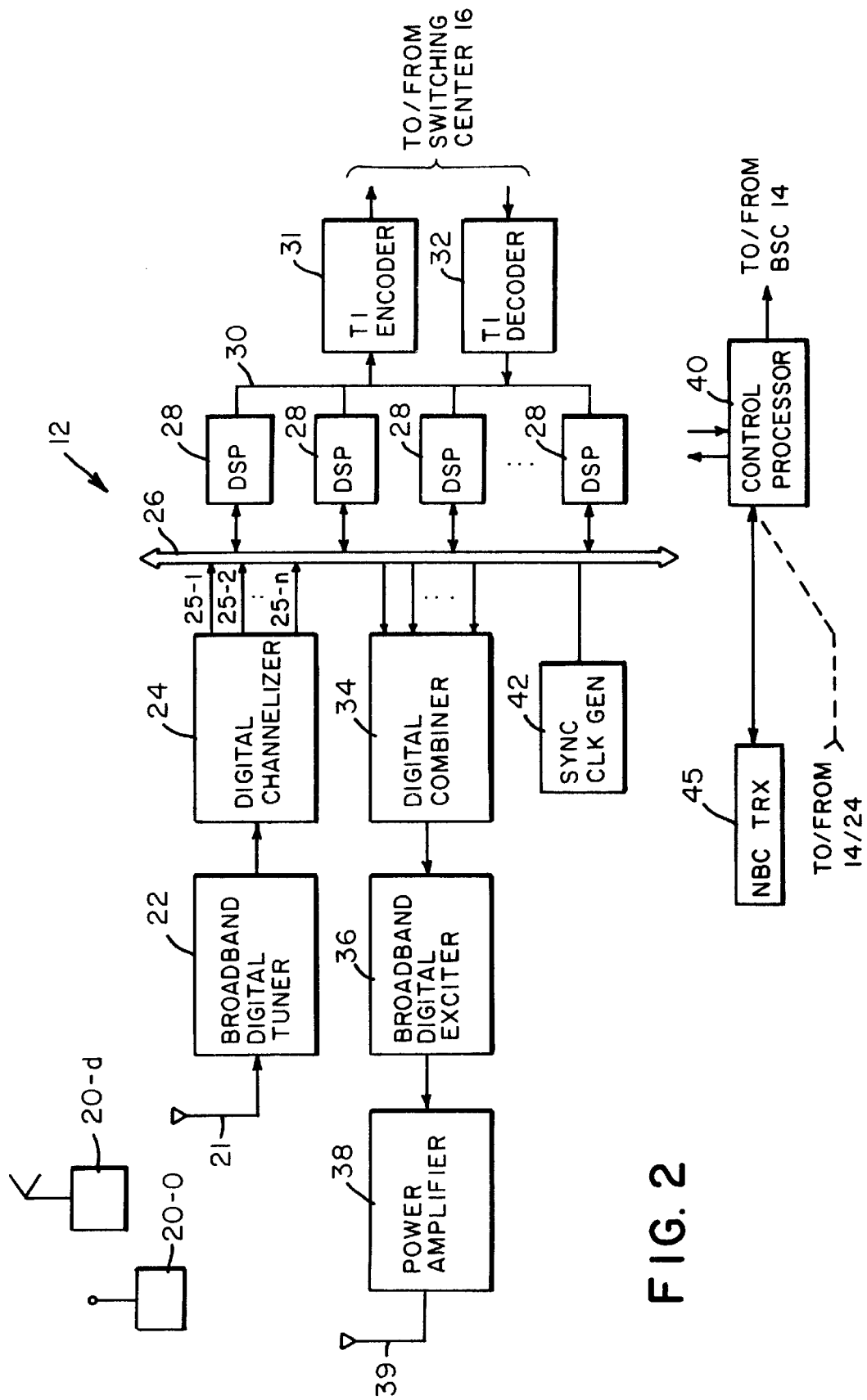
FIG. 2 is a block diagram of one preferred arrangement of the base stations shown in FIG. 1 to obtain signal strength measurements.

Turning attention now to the drawings, FIG. 1 illustrates a Wireless Local Loop (WLL) communication system 10 in which the invention may be advantageously used. The system 10 includes a plurality of base stations 12 with each base station 12 being associated with a sub-area, or cell, of a geographical territory assigned to a wireless service provider. A number of the base stations, 12-1, 12-2, . . . , 12-n, are typically arranged in a group, or cluster. A base station controller 14 and telephone switching center 16 provide connections between the base stations 12 and a public switch telephone network (PSTN) 18.

The system 10 typically provides multiple Fixed Access Units (FAUs) 20-o and 20-d at least standard voice quality communication service, supporting the ability to communicate among each other or with other devices that may be connected to the PSTN 18. The Base Station Controller (BSC) 14 is responsible for coordinating these connections by controlling the operation of the base stations 12 and the switching center 16 to set up the appropriate transmission and reception of voice (or possibly data) and control signals between FAUs 20 and the PSTN 18. For example, when an FAU 20 first requests service it transmits a control signal which is received by one of the base stations 12. This control signal is forwarded through the base station controller 14 and to the switching center 16. The switching center 16 then sets up a voice or data connection to the PSTN 18, while the base station controller 14 determines a radio frequency assignment for the FAU 20 requesting access and arranges for radio transceivers located within the base station to handle the over-the-air communications with the FAU 20.

The present invention lies in the manner in which a frequency assignment is determined for the FAUs 20. Although the following detailed description will describe an embodiment in which frequency assignment is carried out in the base station controller 14, it should be understood that in some wireless system architectures, base station controllers 14 may not be present and/or it may otherwise be desirable to carry out the frequency assignment within processors located in the base station 12 or even with processors located in the switching center 16.

The invention is specifically adapted to provide efficient frequency assignments in systems for which the base stations 12 make use of broadband radio transceivers which can transmit and receive on multiple radio frequency carriers at the same time while providing information concerning the receive signal strength across a broadband of operating frequencies.

The base station 12 consists of a receive antenna 21, one or more broadband digital tuners 22, one or more digital channelizers 24, a bit-parallel Time Division Multiple (TDM) sample bus 26, a plurality of digital signal processors (DSPs) 28 programmed to operate as demodulators and modulators, an interprocessor communication mechanism 30, a transport signal (T-1) encoder 31, a T-1 decoder 32, one or more digital combiners 34, one or more broadband digital exciters 36, a power amplifier 38, a transmit antenna 39, a control processor 40, and a synchronization clock generator 42.

Briefly, on the receive side (that is, with respect to the base station 12), radio frequency (RF) carrier signals from the FAUs 20 are first received at the receive antenna 21 and then forwarded to the broadband digital tuner 22. The digital tuner 22 down converts the RF signals to an intermediate frequency (IF) and then performs an analog to digital (A/D) conversion to produce a digital composite signal 23.

The digital channelizer 24 implements a filter bank to separate the composite digital signal 23 into a plurality, n, of individual digital channel signals 25-1, 25-2, . . . , 25-n (collectively, channel signals 25). The digital channelizer 24 may implement the filter bank using any of several methods as is known in the art. The samples which comprise the n digital channel signals 25 are then provided over the TDM bus 26 to the DSPs 28. A subset of the DSPs 28 are programmed to remove the modulation on the channel signals 25 as specified by the air interface standard in use. As part of this process, the DSPs 28 determine a receive signal strength for each of the n digital channel signals and then periodically provide this information to the control processor to which in turn forwards the receive signal strength information to the base station controller 14.

The demodulated signal outputs of the DSPs 28, representing baseband audio or data signals, are then forwarded over the communication mechanism 30 to the encoder 31, which in turn reformats the demodulated signals as necessary for transmission over a land based telephone line forwarding such to the switching center 16 (FIG. 1).

The signal flow on the transmit side of the base station 12 is analogous.

For a more detailed description of such a system please refer to co-pending U.S. patent application entitled "Wideband Wireless Base Station Making Use of Time Division Multiple Access Bus to Effect Switchable Connections to Modulator/Demodulator Resources", Ser. No. 08/251,914 filed Jun. 1, 1994 which is assigned to AirNet Communications Corporation, the assignee of this application.

In order to set up each call, the control processor 40 in the base station 12 must exchange certain control information with the base station controller 14. For example, when an FAU 20 wishes to place a call, it indicates this by transmitting on one or more control signal channels. These control signals may be in band or out of band signals present in one or more of the channel signals output by the channelizer 24 for input to the combiner 34. If out of band, a separate control signal transceiver 45 may be used to receive and transmit such control signaling.

In any event, the control signals are forwarded to the control processor 40 which requests the BSC 14 (FIG. 1) to set up the end to end connection through the switching center 16. Upon receiving an indication from the switching center 16 that the connection can be made at the remote end, the base station controller 16 then performs a number of steps to insure that the appropriate signal path through the base station 12 is enabled. Of particular interest in this case is the need to determine a pair of transmit and receive radio frequencies to be used for the call. As mentioned previously, the present invention lies in the details of how frequencies are allocated by the base station controller 14 for use among the various base stations 12. The following description will explain how an FAU transmit frequency (i.e., in the uplink, or FAU 20 to base station 12 direction) is determined. The receive frequency (i.e., in the downlink or base station 12 to FAU 20 direction), is typically determined as a constant offset from the FAU transmit frequency.

The FAUs 20 are stationary terminals and thus the WLLs system 10 shown in FIG. 1 permits the use of directional antennas for certain FAUs such as shown for FAU 20-d. Although directional antennas do add initial cost to the system and require a more precise installation of the FAUs 20-d, three advantages do occur. First, the greater gain provides a dramatic increase in the maximum cell radius. Second, the FAU 20-d receives less interference from directions other than in the direct line of sight from the base station 12. Third, the base station 12 receives less interference from other FAUs 20 because transmit energy from the directional FAU 20-d is highly concentrated along this line of sight access.

Figure 3:
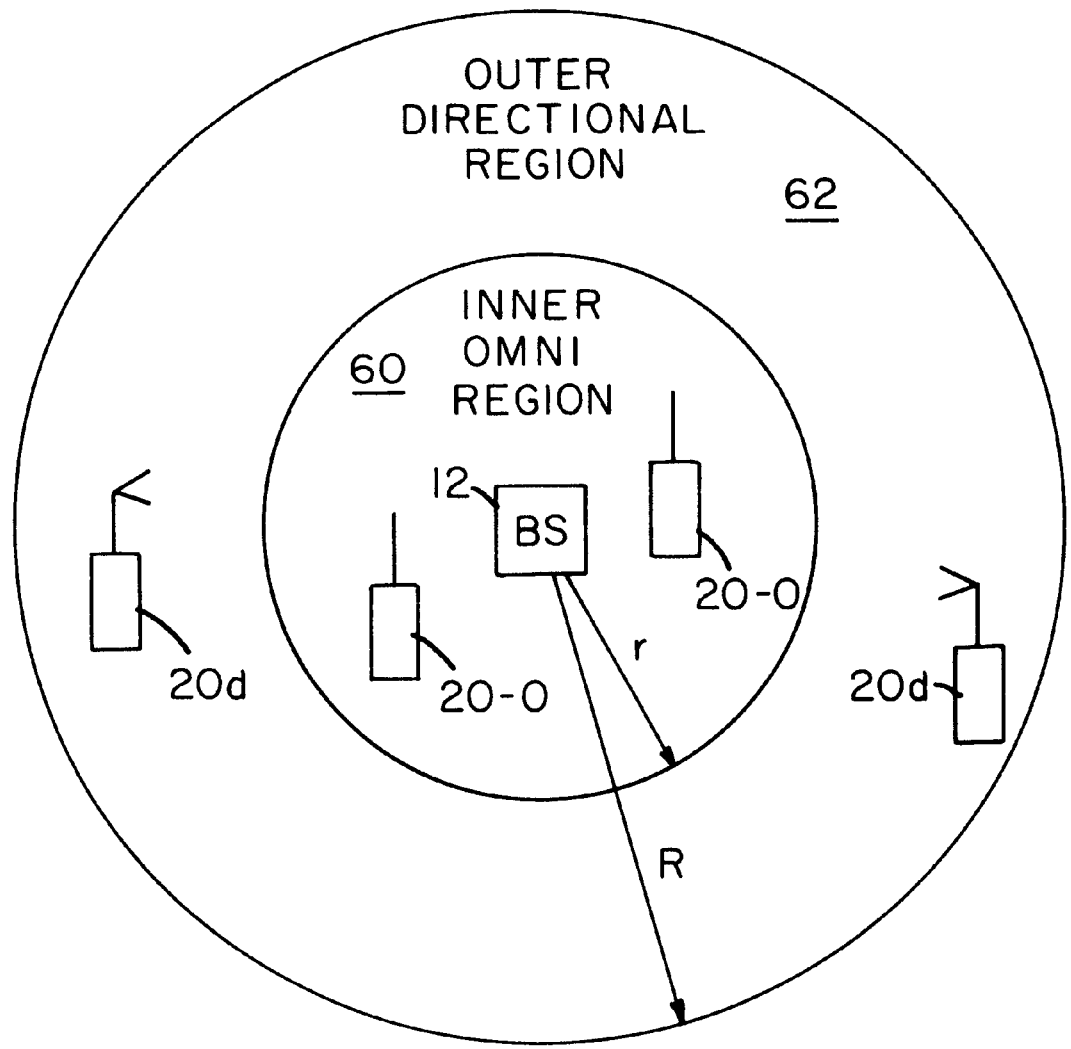
FIG. 3 is an illustration of a cell plan layout in which each cell has an inner omni-directional region and outer directional region.

In accordance with the invention however, not all FAUs 20 are provided with directional antennas. FIG. 3 illustrates the situation as contemplated with the use of both omnidirectional FAUs 20-o located within an inner region 60 within a specified radius r of the base station 12. The directional antenna FAUs 20d are used in an outer region 62 beyond the radius r out to a radius R which represents the cell boundary. Optimally, the ratio between the inner radius, r, and outer radius, R, is chosen to balance the carrier-to-interference (C/I) ratio to be about the same on average for FAUs in both the inner and outer regions.

In such a cell there must still be assurance that the omni directional FAUs 20-o are operating with adequate carrier-to-interference (C/I) ratio. In particular, even if the system is originally planned to provide adequate C/I for directional FAUs 20-d in the outer region 62, simply doing this alone is incompatible with providing adequate C/I for the omnidirectional FAUs 20-o employed in the inner region 60. This difficulty is resolved by using separate frequency subsets for the inner region 60 and outer region 62, and by power control on the omnidirectional FAU 20-o uplink and downlink, and by assigning different frequency subsets for the inner 60 and outer regions 62, the inner regions 60 in adjacent cells therefore are assured of maintaining some distance from one another. By operating with a limited power level which is only needed to complete the link out to the distance r, the overall interference situation for the inner region 60 will be as though the inner region 60 were operating at a much higher frequency reuse factor than is actually employed.

Figure 4:
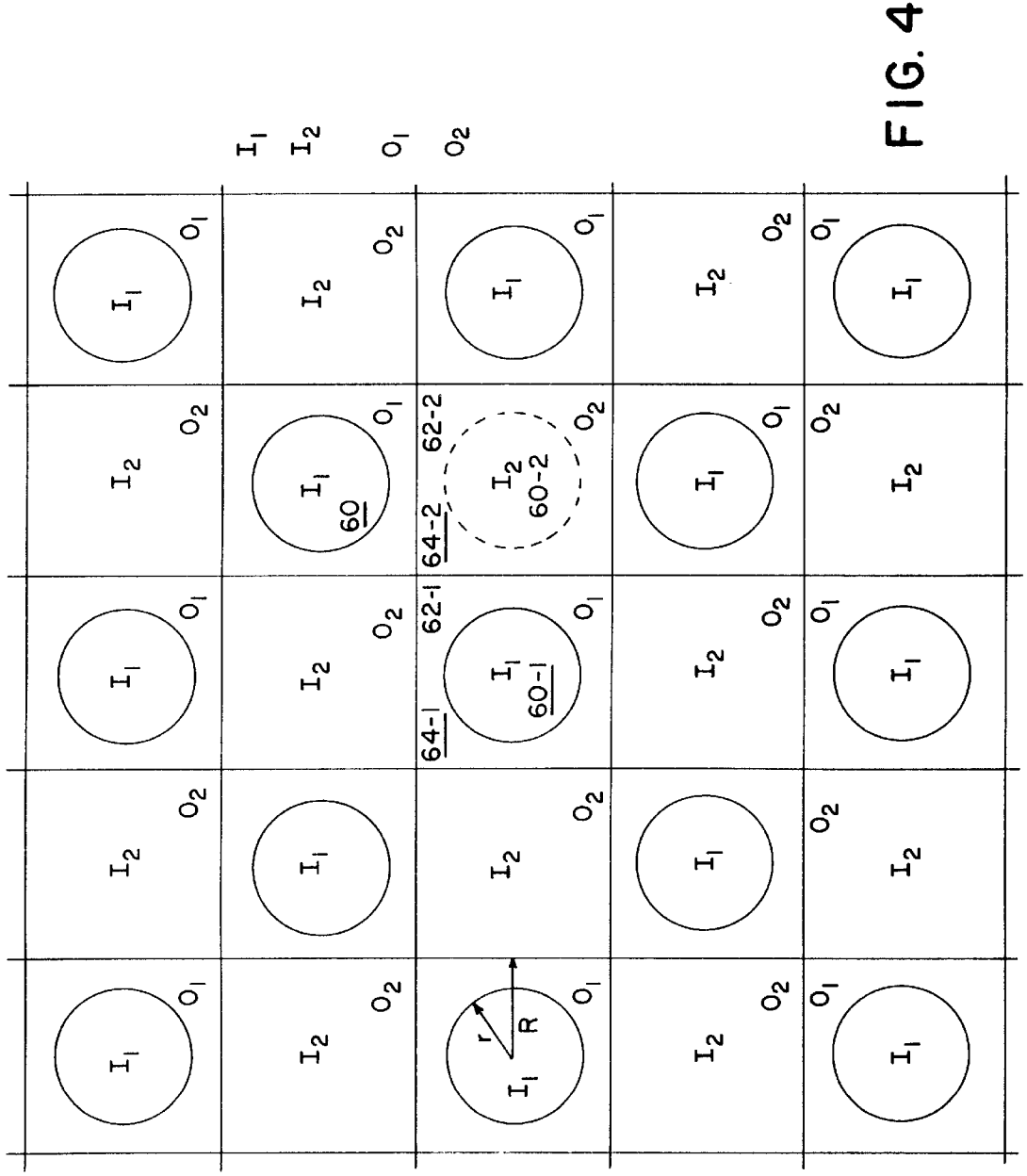
FIG. 4 illustrates an N=2 frequency reuse plan in accordance with the invention showing frequency assignments to inner and outer regions of each cell.

FIG. 4 illustrates the situation more particularly, showing a deployment of base stations for a frequency reuse factor of N=2. Only homologous cells are shown in detail, for the sake of clarity. In this scenario, like cells are laid out in a "checkerboard"fashion. Although the outer regions 62 are shown as being circular, they are typically not perfect circles but rather, the exact shape of course depending upon the number of factors including the surrounding terrain features.

Since two frequency sets are needed in each cell, for the inner 60 and outer region 62, and since N=2, the available frequencies are thus divided into four sets. These include sets I1 and I2 assigned for use in the inner regions 60, and sets O1 and O2 assigned for use in the outer regions 62. Frequency subset assignments are made such that adjacent cells use different frequency subsets in both the inner and outer regions. For example, a cell 64-1 uses the frequency set I1 in the inner region 60-1 and set O1 in its outer region 62-1. An adjacent cell 64-2 uses frequency set I2 in its inner region 60-2 and set O2 in its outer region 62-2.

Although the channels are available for use in each region of a cell in the example being discussed, the channel availability is derated, such as to permit for example, only a certain number of channels in sets I1 and I2 to be active in the inner region 60, and to permit only a certain number of channels in sets O1 and O2 to be active in the outer region 62. By "derating"the available number of channels in this fashion, it has been determined that the C/I ratio can be increased remarkably.

As previously mentioned the channel selection algorithm makes further use of the broadband digital tuner 22 and digital channelizer 24, which provide a measure of the signal energy in each of the 166 channels across the available 5 MHz bandwidth to the base station controller 14.

Figure 5:
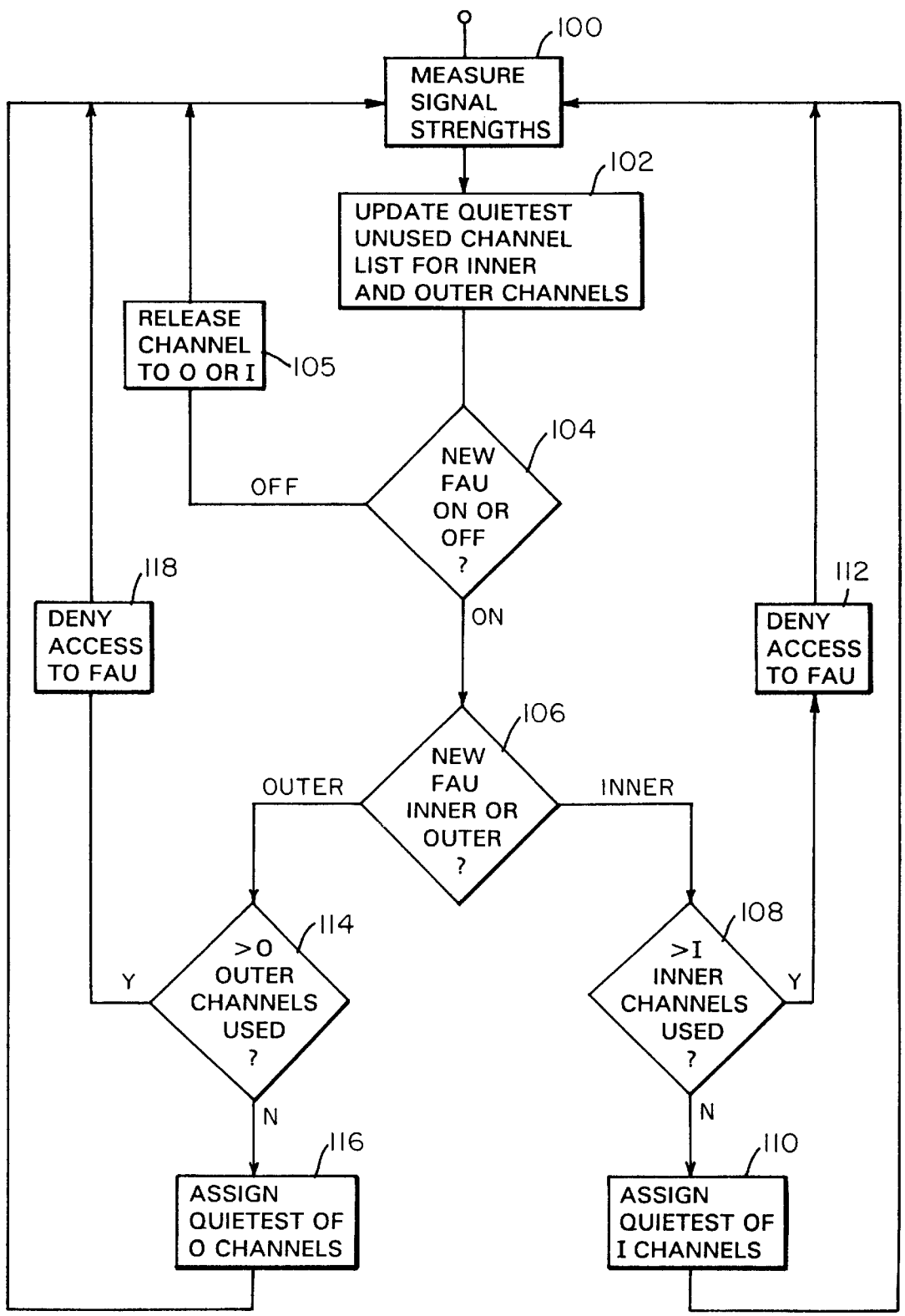
FIG. 5 is a flowchart of operations performed by a base station or base station controller in order to assign channels to Fixed Access Units (FAUs).

Now more particularly, the flow diagram of FIG. 5 illustrates the process of assigning a frequency to a new FAU 20 as it comes on line. In a first step 100, the available signal strengths for the channels in each of the cells are periodically measured by the digital channelizer 24 and reported by the base station 12 to the base station controller 14. In step 102 the base station controller 14 updates a list of quietest unused channels for each of the inner and outer portions of the particular cell. This is, for example, a pair of lists of unused channels referred to herein as the I-unused list and the O-unused list. The I-unused channel list and O-unused channel list are taken from either the I1 and O1, or I2 and O2 subsets respectively, assigned to the particular cell. The I-unused and O-unused lists are kept in a memory portion of the base station controller 14 (FIG. 1).

In step 104 which is periodically entered into, it is determined whether or not a request to permit an FAU 20 to access the system 10 has been received. If the request is for the FAU 20 to be removed from the active list, control proceeds to step 105 where the channel which was presently in use is released and returned to either the I-unused or O-unused list of free channels, depending upon where the FAU is located. If however, in step 104, a new FAU 20 requires access to the system 10, control passes to step 106 where it is determined if the FAU 20 is in the inner region 60 or outer region 62 of the cell. If the FAU 20 is in the inner region 60, control passes to step 108.

In step 108, the number of inner channels presently in use is examined. If less than a predetermined number, I, of the inner channels have not yet been used, control passes to step 110 where the quietest of the available channels on the I-unused list is assigned for use by the new FAU 20.

If however, in step 108 no inner channels are available for use, that is, the predetermined number I of inner channels are already in use, control passes to step 112 where access is denied to the FAU 20.

In step 106, the FAU 20 requesting access is located in the outer region 62 of the cell, and control passes to step 114 where it is first determined if the number of outer channels in use exceeds a pre-determined number, O. If this is the case, then control passes to step 116 wherein the quietest of the available outer channels is assigned for use by the FAU 20. If the maximum number, O, of outer region 62 channels has already been assigned, then control passes to step 118, where the FAU 20 is not permitted to operate.

A specific example of implementing the invention for use with the analog Advance Mobile Phone Service (AMPS) protocol will now be described. Consider the case of a 5 MHz spectral allocation per cell. In each cell are thus available 166 channels, each with a 30 kHz standard AMPS bandwidth. Assuming that fourteen (14) control channels are reserved, at least two control channels per cell for the inner 60 and outer regions 62 in a standard seven cell reuse pattern. This leaves 152 total channels for communication channel use. Given N=2, then 76 channels are available for use in each cell. The 76 channels per cell are then each divided into the two sub-sets, sets I1 or I2 for supporting the inner portion of the cell, and the other set O1 or O2 for supporting the outer portion of the cell.

The invention was subjected to a computer simulation in which the seventy-six (76) channels per cell were de-rated to permit each base station to use sixty-two (62) channels. Twenty-four (24) channels were allocated to the omnidirectional inner region 60 and thirty-eight (38) channels allocated for use in the directional outer region 62. The FAUs 20 were assumed to be uniformly distributed with the cell having an inner region 60 with a radius r of 50% of the total cell radius R, thereby having approximately 40% of the cell area and channels to be devoted to the inner region 60 and approximately 60% of the area and available channels to using the directional antennas in the outer region 62. The simulation indicated mean and 99th percentile carrier-to-interference (C-I) ratios as follows:

| Receive Link    | Mean C/I | 99th percentile C/I |
|-----------------|----------|---------------------|
| BTS inner region | 30 dB    | 18 dB               |
| FAU inner region | 29.6 dB  | 18 dB               |
| BTS outer region | 30.3 dB  | 19 dB               |
| FAU outer region | 29.4 dB  | 19 dB               |

Simulation results for an N=3 reuse pattern with random channel selection and no derating were:

| Receive Link    | Mean C/I | 99th percentile C/I |
|-----------------|----------|---------------------|
| BTS inner region | 29 dB    | 24 dB               |
| FAU inner region | 29.2 dB  | 24 dB               |
| BTS outer region | 30 dB    | 22 dB               |
| FAU outer region | 29.4 dB  | 23 dB               |

The simulations thus indicated that the N=2 cell reuse pattern indicated in FIG. 4 with quietest channel de-rating can provide a higher mean C/I ratio than an N=3 cell frequency reuse plan operating with simple random channel selection. In other words, the frequency assignment scheme can be used to advantage to provide a better C/I ratio, and in effect allow more channels per cell to operate than could otherwise be achieved when a wireless system 10 is implemented using narrowband transceivers and conventional channel assignment schemes.

The foregoing description has been limited to specific embodiments of this invention. It is apparent, however, that variation and modifications may be made to the invention as described above with the attainment of some or all of its advantages.

What is claimed is:

1. A method of assigning a frequency to a remote unit in a wireless communication system, the wireless communication system employing a number of base stations, the remote units which are located in an inner region of the cells using omni-directional antennas, and the remote units which are located in an outer region of the cells using directional antennas, and wherein each cell has at least two groups of frequencies assigned to it so that different frequencies are used for the remote units located in the inner region of a cell than the frequencies that are used in the outer region of the same cell, such that there are two different groups of frequencies assigned to adjacent cells, the method comprising the steps of:

determining when a new remote unit is requesting service from the communication system;

detecting the region of the cell within which the remote unit is located by measuring a signal strength indication, RSSI, of a radio signal received from the new mobile unit at each of the sector antennas;

detecting whether the remote unit is located in the inner region of the cell or the outer region of the cell, by comparing the RSSI to a predetermined threshold value;

if the remote unit is located in an inner region of the cell, assigning a frequency to the remote unit which is not in use in the outer region of the cell.

2. A method as in claim 1 additionally comprising the steps of:

keeping a list of quietest channels by examining the RSSIs from among those radio frequencies not presently in use, and ensuring that a minimum number of radio frequencies remain unused in each cell such that among the unused operating radio frequencies in any given cell, only a subset of the radio frequencies are ever used.

3. A wireless system for operation in a service area which is divided into cells, comprising:

a plurality of remote subscriber Field Access Units, FAUs, located throughout the service area, such that the FAUs use omni-directional antennas in an inner region of the cells, and such that the FAUs use directional antennas in an outer region of the cells;

a plurality of base stations located in the cells, for transmitting and receiving radio signals from the FAUs, and limiting the operating power of such radio signals transmitted to and received from FAUs located in the inner regions of the cells to a power level needed to complete a link between the base station and the FAU, and the base stations having the capability to determine a received signal power value for each available operating radio frequency in the system;

channel selection means, connected to receive the signal power values from the base stations, for selecting operating radio frequencies for the FAUs in each cell by keeping a list of quietest channels by examining the received signal power values from among those operating radio frequencies not presently in use, and ensuring that a minimum number of operating radio frequencies remain unused such that among the unused operating radio frequencies in any given cell, only a subset of the operating radio frequencies are ever used.

4. A wireless system as in claim 1 wherein the inner region of a cell is selected as that portion of the service area located within an inner radius, r, about the center of the cell.

5. A wireless system as in claim 4 wherein the outer region of a cell is selected as that portion of the service area located between the inner radius, r, and an outer radius, R, located near an outer boundary of the cell.

6. A wireless system as in claim 5 wherein the inner radius, r, and outer radius, R, are chosen such that the average carrier-to-interference (C/I) ratio is the same on average for signals received by FAUs located in both the inner and outer regions.

7. A wireless system as in claim 1 wherein different subsets of operating radio frequencies are made availabe for use for the inner and outer regions.

8. A wireless system as in claim 7 wherein a frequency reuse factor of two is used among the cells such that four radio frequency sets are allocated among the cells, such that a first pair of radio frequency sets, I1 and I2, are used in the inner regions of adjacent cells and such that a second pair of radio frequency sets, O1 and O2, are used in the outer regions of adjacent cells.

* * * * *